(12) United States Patent
Fraisse et al.

(10) Patent No.: US 7,232,190 B2
(45) Date of Patent: Jun. 19, 2007

(54) RESERVOIR FOR A HYDRAULIC CIRCUIT

(75) Inventors: Emmanuel Fraisse, Paris (FR);
François Gaffe, Rosny sous Bois (FR)

(73) Assignee: Robert Bosch, Stuttgart (DE)

( * ) Notice: Subject to any disclaimer, the term of this patent is extended or adjusted under 35 U.S.C. 154(b) by 0 days.

(21) Appl. No.: 11/394,302

(22) Filed: Mar. 30, 2006

(65) Prior Publication Data
US 2006/0220445 A1 Oct. 5, 2006

Related U.S. Application Data

(63) Continuation of application No. 10/493,560, filed on Apr. 23, 2004, now abandoned.

(51) Int. Cl.
*B60T 13/18* (2006.01)
*B65D 51/16* (2006.01)
(52) U.S. Cl. .................. 303/11; 303/115.1; 60/585; 220/366.1
(58) Field of Classification Search ........... 215/307, 215/309; 220/366.1, 367.1, 374; 60/585; 303/115.1, 11
See application file for complete search history.

(56) References Cited

U.S. PATENT DOCUMENTS

| | | | | |
|---|---|---|---|---|
| 2,263,644 | A * | 11/1941 | Pierce | 220/303 |
| 2,769,580 | A * | 11/1956 | Hudson et al. | 222/397 |
| 3,147,876 | A * | 9/1964 | Lepore | 215/261 |
| 3,343,710 | A * | 9/1967 | Anton et al. | 220/303 |
| 3,724,706 | A * | 4/1973 | Slocum | 220/3.8 |
| 3,944,104 | A * | 3/1976 | Watson et al. | 215/307 |
| 3,987,921 | A * | 10/1976 | Aichinger | 215/307 |
| 4,193,509 | A * | 3/1980 | Dunn et al. | 215/330 |
| 4,337,875 | A * | 7/1982 | Lyons | 220/368 |
| 4,398,645 | A * | 8/1983 | Toeppen | 215/252 |
| 4,646,947 | A * | 3/1987 | Stull | 222/397 |
| 5,020,683 | A * | 6/1991 | Strassheimer | 215/354 |
| 5,197,620 | A * | 3/1993 | Gregory | 215/307 |
| 5,509,564 | A * | 4/1996 | Knoop | 220/360 |
| 5,947,311 | A * | 9/1999 | Gregory | 215/341 |
| 6,178,747 | B1 * | 1/2001 | Tang | 60/585 |
| 6,202,870 | B1 * | 3/2001 | Pearce | 215/307 |
| 6,854,614 | B2 * | 2/2005 | Sprick | 215/329 |
| 7,055,708 | B1 * | 6/2006 | Haffner et al. | 215/222 |

* cited by examiner

*Primary Examiner*—Robert A. Siconolfi
(74) *Attorney, Agent, or Firm*—Leo H. McCormick, Jr.; Sarah Taylor

(57) ABSTRACT

A tank according to the invention comprises a casing, a filling port (5) extending, on the outside of said tank, into a filling neck (7), which is provided with a screw thread having a pitch (p) and which cooperates with a cap (9). The inner surface of the cap cooperating with the screw thread, at least one outlet port for the hydraulic-fluid flow towards a hydraulic circuit. The inner space (3) of the tank is connected with ambient air through two channels (45), that extend from a first lengthwise end (47) of the filling neck (7) to a second lengthwise end (49) of the filling neck (7) and through a helical passage (41) between the filling neck (7) and the cap (9) to connect the inside of the tank with the ambient air to avoid the development of negative pressure in the tank.

1 Claim, 4 Drawing Sheets

RESERVOIR FOR A HYDRAULIC CIRCUIT

This is a continuation of U.S. patent application Ser. No. 10/493,560 filed Apr. 23, 2004 now abandoned.

The present invention mainly relates to a hydraulic tank for an improved-safety supply of a hydraulic circuit with brake fluid and to a braking system fitted with such a tank and it relates, more particularly, to a brake-fluid tank for the supply of a braking circuit with brake fluid and, more especially, for the supply of an electrohydraulic braking circuit with brake fluid.

A braking circuit of a conventional type comprises a master cylinder, fed from a brake-fluid tank and actuated by an actuating rod, connected with a brake pedal, which is controlled by the driver. The braking circuits also comprise brakes, connected to the master cylinder and from which they receive a pressure fluid on a braking action.

As regards the electrohydraulic braking circuits, in a normal operating situation, the braking is not taken charge of by the master cylinder but instead by a pump, which delivers pressure fluid to the brakes mounted at the wheels of the vehicle. Such pump is controlled by a computer, on the basis of braking information received from sensors, arranged e.g. at the actuating rod. In an electrohydraulic braking circuit, and in a normal operating situation, the master cylinder is used for simulating the mechanical reaction of the braking circuit whereas, under deteriored conditions, for instance when either the computer or the hydraulic pump happens to be unavailable, the master cylinder is used as the source of pressure brake fluid for the brakes, quite conventionally.

In conventional braking circuits as well as in electrohydraulic braking circuits, the brake fluid is supplied from a tank. As concerns conventional braking systems, the tank is disposed on the master cylinder and it delivers fluid to first and second hydraulic chambers, connected to the brakes while, in the case of electrohydraulic braking circuits, a first tank supplies the master cylinder with fluid and a second tank feeds the hydraulic pump.

In the course of the gravity flow of the brake fluid from the tank to the braking circuit, the brake-fluid volume contained in the tank is reducing, which means that a greater space is available for the air inside the tank, above the brake-fluid surface. It results in that the air pressure inside the tank is reducing too, and in that a negative pressure is created above the brake-fluid surface, which fact is likely to stop or at least to impede the fluid flow into the master cylinder or its drawing by the hydraulic pump.

Accordingly, in a well-known manner, such tanks are fitted with breathing means capable of supplying the inner space of the tank with atmospheric-pressure air, so as to equilibrate the inner pneumatic pressure of the tank with the ambient-air pressure in order to avoid a negative pressure.

In a well-known manner, such breathing means consist of a passage provided at a filling neck for the supply of the tank with brake fluid. More especially, the neck, intended for the supply of the tank with brake fluid, cooperates with a sealing means, for instance a cap, through a screw thread, the pitch of such screw thread cut in the cap being such as to provide a passage connecting the inner space of the tank with the ambient air, thus letting air into the tank and avoiding the detrimental influence of a negative pressure on the brake fluid inside the tank.

Yet, such air passage is small-sized in order to prevent a fluid flow out of the tank and an ingress of some foreign particulate matter into the latter, which might interfere with a sound operation of the braking system. Besides, the brake-fluid tank is arranged in the motor compartment, which is not proof against outer pollutants and which is susceptible to a rapid fouling by foreign particles of any kind whatsoever, e.g. dirt, grease, likely to block the passage, provided between the filling neck of the tank and the closing cap cooperating with such neck. When this air passage, connecting the outside with the inside of the tank is blocked, a negative pressure is created within the tank, which means that the brake-fluid flow towards the brakes can no longer be steady, with the result that the braking efficiency will probably be reduced.

Therefore, it is an object of the present invention to provide a hydraulic-fluid tank, for a reliable supply of a hydraulic circuit with hydraulic fluid.

Another object of the invention consists in providing a braking system with no risk of a loss in the brake-fluid supply.

These objects are achieved, in accordance with this invention, by a hydraulic-fluid tank, comprising a filling neck closed by a cap, means for the brake-fluid flow towards a hydraulic circuit and means for the connection of the inner space of the tank with the outside and having an adequate cross-section area to preclude any blockage of said means, which are capable of cooperating with breathing means of a known type so as to improve their reliability.

In other words, these connecting means are transverse channels provided in the outer periphery of the filling neck and extending from the lower part of the neck to its upper part, and exhibiting a comparatively much larger cross-section area than that of the helical passage of the breathing means of a known type.

The main subject of the present invention is a hydraulic-fluid tank, comprising a casing, defining an inner space, a filling port extending, on the outside of said tank, into a filling neck, which is provided with a screw thread having a given pitch and cooperating with a cap, the inner surface of said cap cooperating with said screw thread, at least one outlet port for the hydraulic-fluid flow towards a hydraulic circuit, means for the connection of the inner space of the tank with the ambient air, characterized in that such means comprise at least one transverse channel, more advantageously two channels, extending from a first lengthwise end of the filling neck to a second lengthwise end of the filling neck, in the opposite direction to the first end, between the filling neck and the cap so as to connect the inside of said tank with the ambient air.

Another subject matter of the present invention is a tank, characterized in that the transverse channels are radially opposite.

The present invention also deals with a tank, characterized in that the channels are provided in the filling neck and intercept each thread of the screw thread of the filling neck.

Another subject matter still of the present invention is a hydraulic tank, characterized in that, in an advantageous manner, the channels are substantially vertical.

According to another aspect of the invention, a hydraulic tank is characterized in that it comprises a helical passage connecting the inner space of the tank with the atmospheric-pressure air, and defined in part by the screw thread provided on the neck and by the inner surface of the cap.

Another subject matter of the present invention is a tank, characterized in that a radially-outer end of the channels is formed by the inner wall of the cap grip.

Another subject matter still of the present invention is a tank, characterized in that, in an advantageous manner, the pitch p of the screw thread ranges from 3 mm to 4 mm and is, more advantageously, equal to 3.67 mm.

This invention also deals with a braking system, comprising a master cylinder, actuated by an actuating rod connected with a brake pedal, and capable of delivering a pressure brake fluid to the brakes disposed at the wheels of a vehicle, characterized in that it comprises a tank.

According to another aspect still of the invention, a braking system, which comprises a computer controlling a hydraulic pump for the supply of the brakes with brake fluid in a normal operating situation, and wherein the master cylinder is used as a braking-feeling simulator in a normal operating situation, is characterized in that it comprises a tank for the supply of the hydraulic pump with fluid.

Other features and advantages of the present invention will be apparent from the following detailed description, when taken in conjunction with the accompanying drawings, in which FIG. 1 is a sectional side view of a preferred embodiment of a tank according to this invention;

Figure 1:
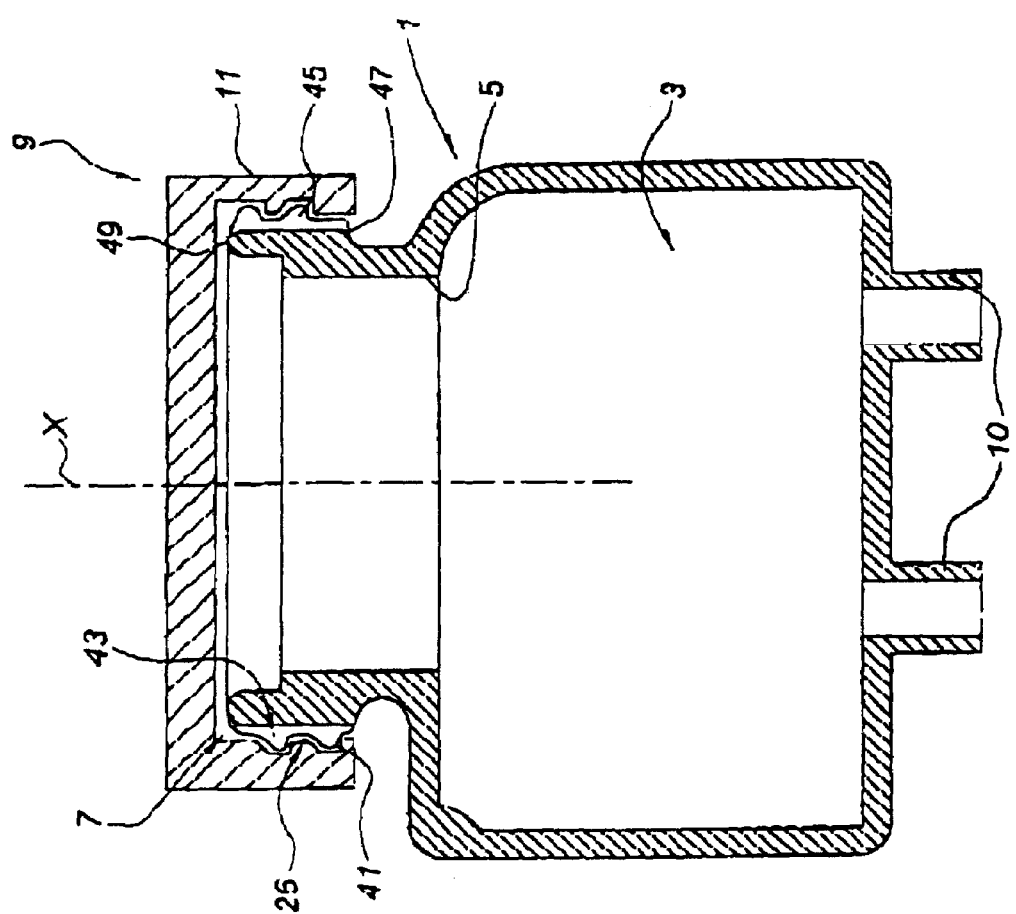

FIG. 1 shows a tank according to the present invention, which comprises a casing 1 defining an inner space 3 containing a hydraulic fluid. The tank also comprises a filling port 5 extending, on the outside of the tank, into a filling neck 7 with an axis X and closed by a cap 9, and the tank also comprises outlet ports for the delivery of the hydraulic fluid to a hydraulic circuit.

The tank also comprises outlet ports 10 in a conventional braking system, a first outlet port is intended for the supply of a primary hydraulic circuit of a master cylinder, whereas a second outlet port is intended for the supply of a secondary hydraulic circuit of the master cylinder.

As regards an electrohydraulic braking system, a first tank supplies the master cylinder, such first tank being similar to that of a conventional braking system, while a second tank is provided with an outlet port connected with a hydraulic pump, and a port for the reinjection of the brake fluid after a brake-actuation phase.

The means, which are intended to fix the cap 9 in position relative to the filling neck 7, consist of means for the screwing of the cap 9 on the filling neck 7 and, more particularly, of the inner surface of a grip 11 forming the peripheral wall of the cap 9 on the outer surface of the filling neck 7.

Figure 2:
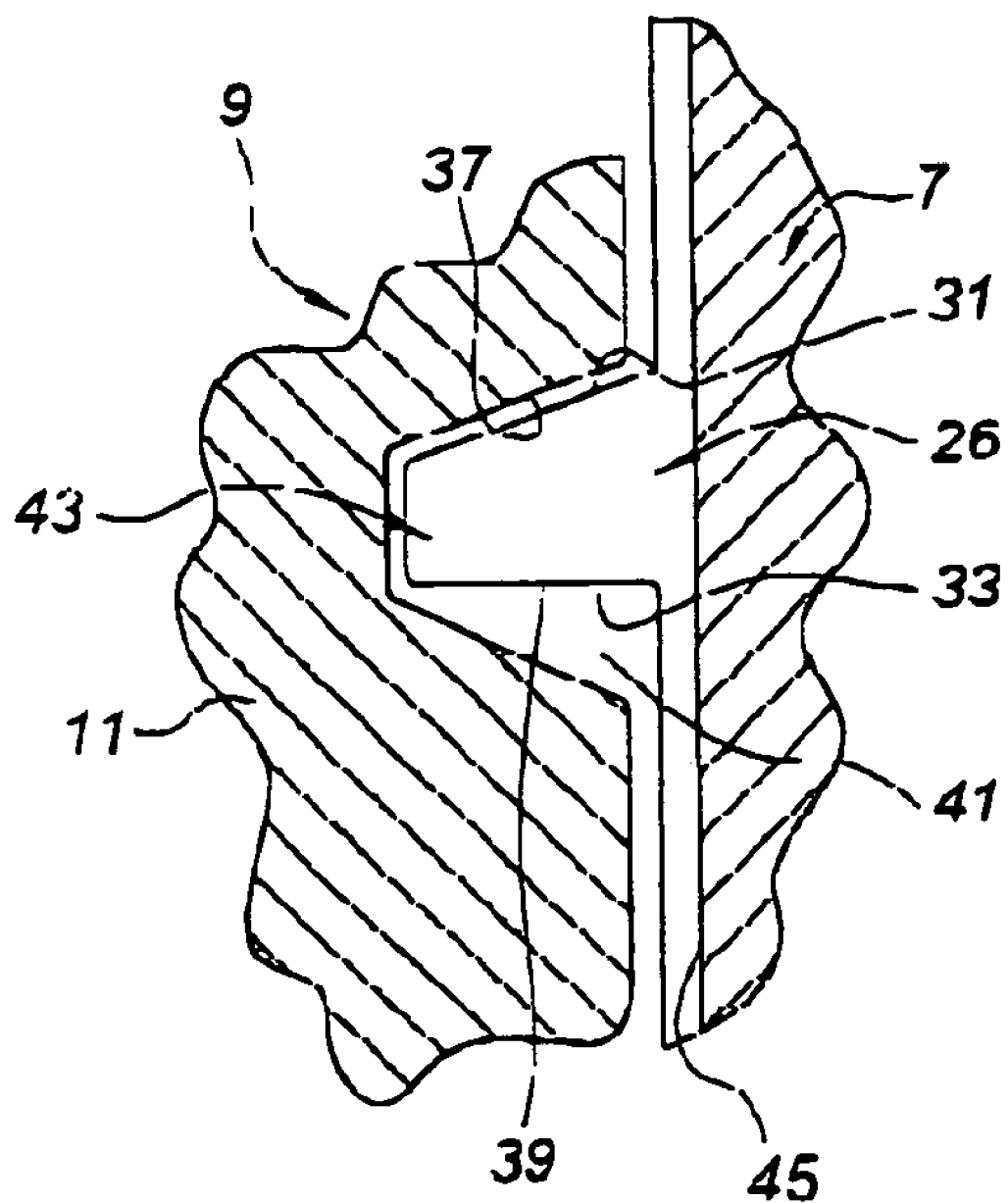
FIG. 2 is a view of a detail from FIG. 1
Figure 3:
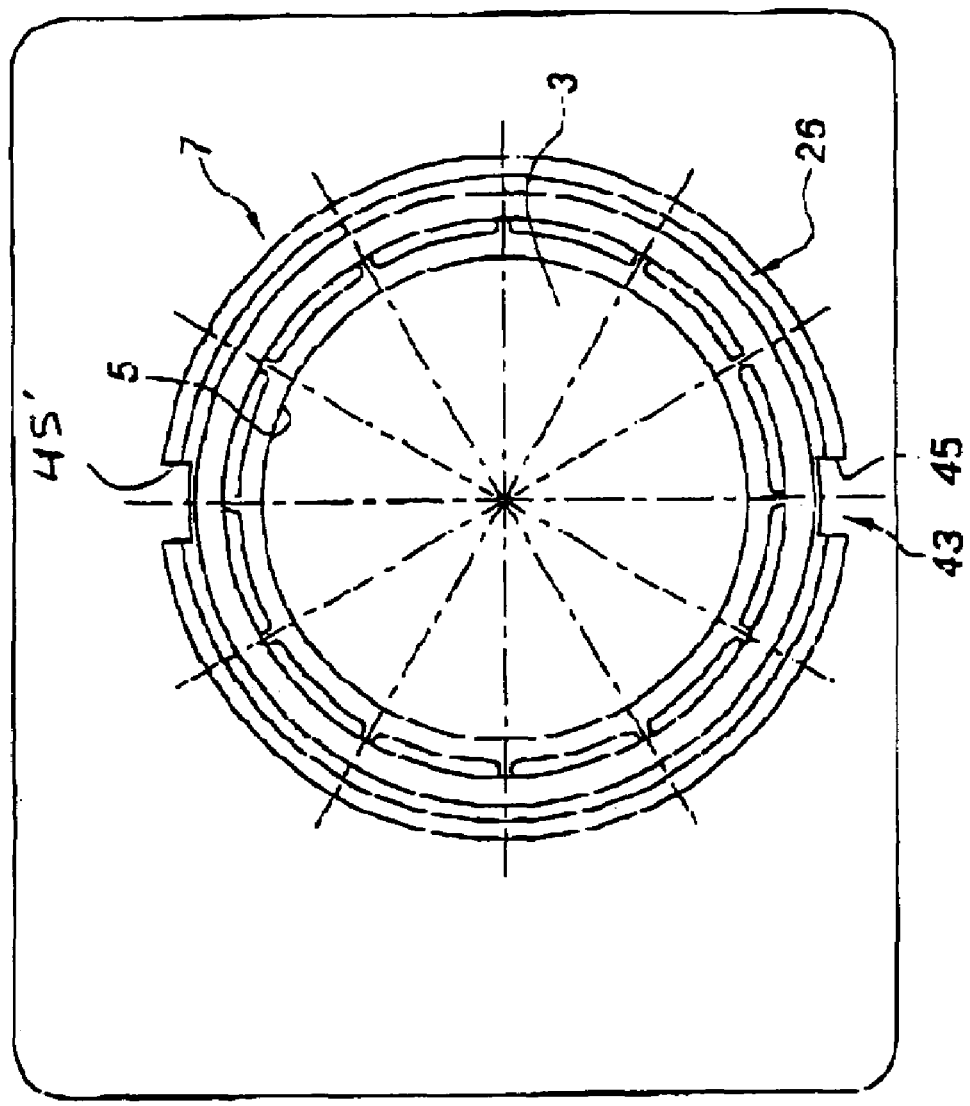
FIG. 3 is a top view of a detail of the tank shown in FIG. 1.

FIG. 2 shows a detail view of the means intended to fix the cap 9 in position on the filling neck 7, which also provide a breathing passage for the inner space 3 of the tank.

Such breathing passage, which connects the inner space 3 with the ambient air, is defined, on the one hand, by the inner wall of the grip 11 of the cap 9 and, on the other hand, by the outer wall of the filling neck 7.

The filling neck 7, having the axis X, comprises on its outer surface a screw thread 26, the pitch of which ranges, in an advantageous manner, from 3 mm to 4 mm and is, more advantageously, equal to 3.67 mm, and which consists of an helix extending from a lower first lengthwise end 47 of the neck 7 towards an upper second lengthwise end 49 of the neck 7. The cross-section of the helix exhibits substantially the shape of a right-angled trapezoid, the major base of which is borne by the outer surface of the neck 7. The minor base of the trapezoid is parallel to the major base, that is parallel to the axis X and it connects with the outer surface of the neck 7 through first and second sides, 31 and 33, that is a first inclined side 31 and a second side 33 which is substantially perpendicular to the axis X.

The cap 9 comprises an internal thread, cooperating with the screw thread 26, cut in the outer surface of the filling neck 7. Said internal thread 32 is provided in the inner surface of the grip 11 and it consists of a helical third inclined face 37 and of a helical fourth inclined face 39 exhibiting a cross section in the shape of a substantially regular trapezoid, so as to define, on the fitting operation, a gap between the second substantially-perpendicular side 33, borne by the neck 7, and the fourth inclined face 39 borne by the cap 9.

On the fitting of the cap 9 on the filling neck 7, the third inclined face 37 comes into contact with the first inclined side 31 whereas a helical gap 41 is formed between the fourth inclined face 39 and the second substantially-perpendicular side 33. In the ordinary course, the passage 41, thus formed between the filling neck and the cap is enough to ensure an air communication between the inner space 3 of the tank and the ambient, so as to avoid a negative pressure inside the tank, which would impede the normal fluid flow into the braking circuit, likely to interfere with a sound operation of the brakes.

Yet, it might happen that the helical passage 41 be blocked by some foreign particulate matter, e.g. dirt or grease, and that is the reason why the tank according to the present invention comprises breathing means 43 consisting of at least one channel 45, which is substantially coaxial with the axis X of the filling neck, and which is provided in the outer periphery of the neck, in the screw thread 26. The channel 45 extends from the first lengthwise end 47 of the neck, facing the casing 1, towards the second lengthwise end 49 of the filling neck, such second end being open and letting the brake fluid in, thus intercepting the helical passage 41 throughout its path.

Therefore, air circulates from the outside to the inner space of the tank, through the channel 45 provided between the outer surface of the filling neck and the inner surface of the grip 11 of the cap. Most advantageously, this second breathing means comprises two channels 45, which are radially opposite and provided in the outer periphery of the filling neck.

The cross-section area of the channels 45 is somewhat larger than the cross-section area of the helical passage 41, constituting the first breathing means. Therefore, the breathing means 43 are definitely less likely to be blocked by foreign particles. As a matter of fact, in spite of their large size, these channels 45 preclude the ingress of foreign particles into the inner space 3 of the tank, because their upper ends, communicating with the inside of the tank, are substantially closed by the upper part of the cap, thus prohibiting the passing through of at least the larger-size particles, which might interfere with a safe operation of the braking circuit.

Figure 4:
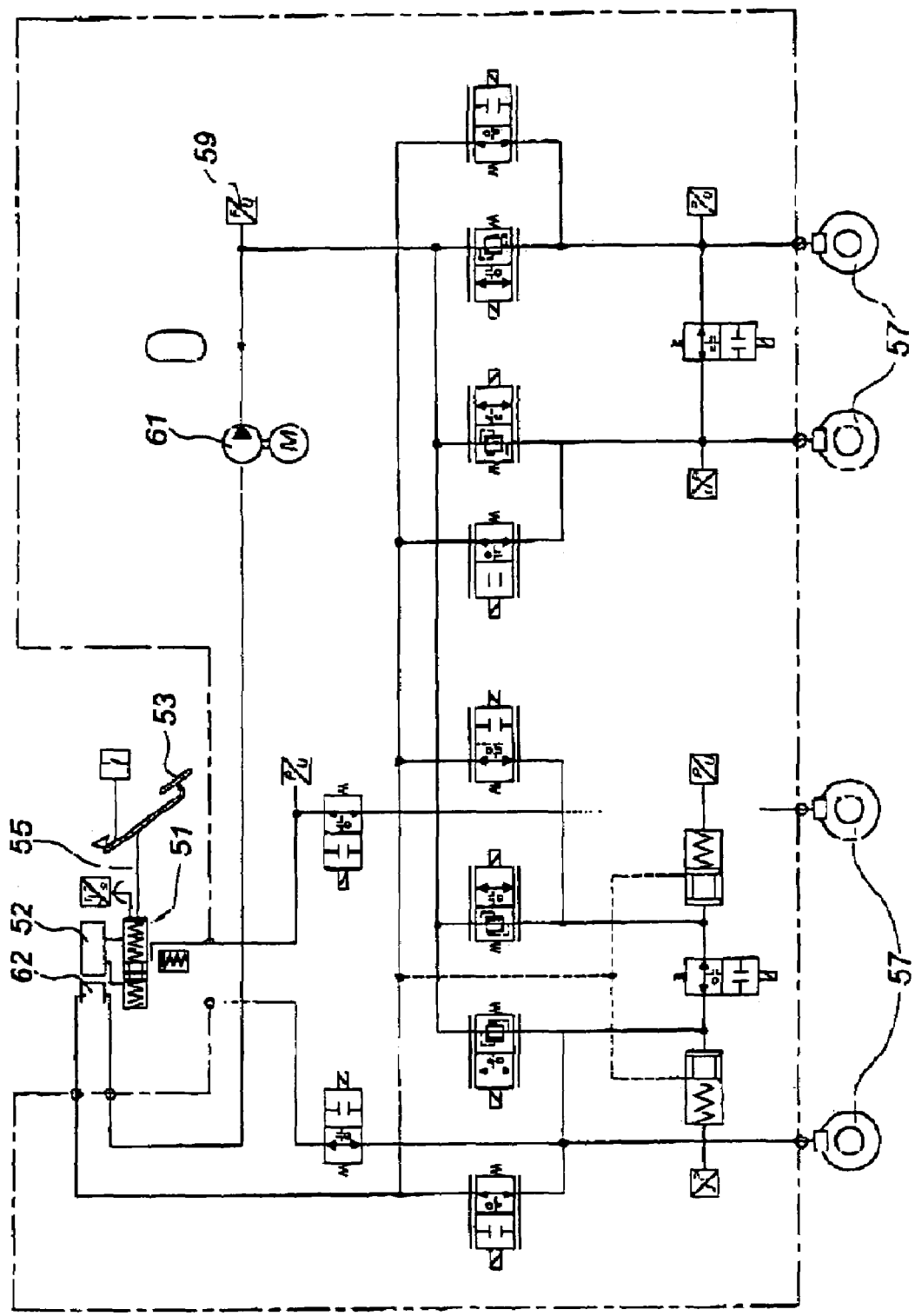
FIG. 4 is a diagram of an electrohydraulic braking system.

FIG. 4 illustrates a electrohydraulic braking system, comprising a master cylinder 51, which is supplied with brake fluid by a first tank 52 according to this invention, and which is connected to a brake pedal 53 through an actuating rod 55. In a normal operating situation, the master cylinder is used for simulating the mechanical reaction of the braking circuit whereas, in a deteriorated operating state, it delivers pressure brake fluid to the brakes 57. The braking system also comprises a computer 59 which commands a hydraulic pump 61, supplied with brake fluid from a second tank 62 according to the present invention, to deliver pressure brake fluid, on the detection of a necessary speed reduction for the vehicle.

Or course, the breathing means may comprise more than two channels, yet two channels are quite capable of coping with a reliable breathing of the inner space of the tank.

It should be understood that the channels 45 may be provided so as to be disposed at an nonzero angle to the vertical.

In the same way, the transverse channels 45 may be provided in the cap, in the inner surface of the grip 11 of the latter, bearing the internal thread 32.

The preferred embodiment of the tank according to the present invention comprises a breathing passage of a known type and breathing means according to this invention, so as to improve the reliability of the brake-fluid delivery to the braking circuit but, of course, the breathing means according to this invention can be implemented independently of the helical breathing passage.

The present invention applies to conventional braking circuits, fitted with a master cylinder, which is actuated by an actuating rod in a normal braking situation.

Most advantageously, this invention applies to an electrohydraulic braking system, wherein the normal braking action is taken charge of by a hydraulic pump, controlled by a computer so as to deliver a pressure brake fluid to the brakes.

The present invention concerns, more particularly, the motor car industry.

And the present invention mainly applies to the design and manufacturing of braking systems for motor vehicles and, more especially, of braking systems for private cars.

What is claimed is:

1. A hydraulic-fluid tank for use in a master cylinder actuated by an actuating rod connected with a brake pedal and for delivering pressure brake fluid to brakes disposed at the wheels of a vehicle and having a computer for controlling a hydraulic pump for the supply of the brakes with brake fluid in a normal operating situation, wherein the master cylinder is used as a braking-feeling simulator in a normal operating situation, said tank comprising a casing, defining an inner space (3), a filling port (5) extending, on the outside of said tank, into a filling neck (7), which is provided with a screw thread (26) having a pitch (p) that cooperates with an inner surface of said cap (9) to close said filling port (5), at least one outlet port for the hydraulic-fluid flow toward a hydraulic circuit, means (43) for the connection of the inner space (3) of the tank with the ambient air to sustain a fluid pressure therein a substantially atmospheric pressure characterized in that said means comprise first and second radially opposite vertical channels (45,45') extending from a first lengthwise end (47) of the filling neck (7) to a second lengthwise end (49) of the filling neck (7) in the opposite direction of the first end (47) between the filling neck (7) and the cap (9), said channels (45,45') being located in the filling neck (7) and intercept each thread of the screw thread (26) of the filling neck (7) to provide a first flow path for ambient air and a helical passage (41) defined in part by a side (33) of the screw thread (26) that is perpendicular to the filling neck (7) and by a face (39) on an internal thread (32) of the cap (9) to provide a second flow path for ambient air to avoid the development of negative pressure in the tank wherein a radially-outer end of the channels (45,45') is formed by the inner wall of the grip (11) of the cap (9), and a pitch (p) of the screw thread (26) ranges from 3 mm to 4 mm, said pitch of thread cut in the cap providing a passage connecting the inner space of the tank with ambient air letting air in the tank and avoiding any detrimental influence of negative pressure on the brake fluid in the tank to allow the computer to actuate the brake.

* * * * *